United States Patent
Wang (10) Patent No.: US 10,189,529 B1
(45) Date of Patent: Jan. 29, 2019

(54) TRICYCLE FOR PLAYING GOLF

(71) Applicant: G-TRIKE L.L.C., Northbrook, IL (US)

(72) Inventor: Yaguang Wang, Northbrook, IL (US)

(73) Assignee: G-TRIKE L.L.C., Northbrook, IL (US)

( * ) Notice: Subject to any disclaimer, the term of this patent is extended or adjusted under 35 U.S.C. 154(b) by 22 days.

(21) Appl. No.: 15/411,991

(22) Filed: Jan. 21, 2017

Related U.S. Application Data (60) Provisional application No. 62/312,466, filed on Mar. 24, 2016.

(51) Int. Cl.
| | |
|---|---|
| *B62K 5/05* | (2013.01) |
| *B62K 15/00* | (2006.01) |
| *B62K 5/06* | (2006.01) |
| *B62K 5/08* | (2006.01) |
| *B62M 9/02* | (2006.01) |
| *B62M 1/36* | (2013.01) |
| *B62K 5/00* | (2013.01) |

(52) U.S. Cl.
CPC .............. *B62K 15/006* (2013.01); *B62K 5/05* (2013.01); *B62K 5/06* (2013.01); *B62K 5/08* (2013.01); *B62M 1/36* (2013.01); *B62M 9/02* (2013.01); *B62K 2005/002* (2013.01)

(58) Field of Classification Search
CPC .......... B62K 15/006; B62K 5/05; B62K 5/06; B62K 5/08; B62K 2005/002
See application file for complete search history.

(56) References Cited

U.S. PATENT DOCUMENTS

| | | | | |
|---|---|---|---|---|
| 3,561,778 A | * | 2/1971 | La Brie .................... | B62K 5/05 280/12.14 |
| 4,277,078 A | * | 7/1981 | Root ....................... | B62K 5/05 280/269 |
| 4,289,324 A | * | 9/1981 | Nemeth .................... | B60R 1/04 16/29 |
| 4,387,836 A | * | 6/1983 | Laesch ...................... | B62J 7/02 224/412 |
| 4,431,205 A | * | 2/1984 | Speicher ................... | B60R 9/06 280/282 |
| 4,522,281 A | * | 6/1985 | Snider ...................... | B62K 5/01 180/208 |
| 4,538,696 A | * | 9/1985 | Carter ..................... | B62B 1/042 180/19.3 |
| 4,917,396 A | * | 4/1990 | Meneses .................. | B62K 5/05 224/415 |

(Continued)

*Primary Examiner* — Joseph M Rocca
*Assistant Examiner* — Michael R Stabley
(74) *Attorney, Agent, or Firm* — Kanika Radhakrishnan; Evergreen Valley Law Group (57) ABSTRACT

Disclosed is a tricycle for playing golf. The tricycle includes a foldable front half comprising a pair of steerable front wheels, a front frame supported between the pair of steerable front wheels, a pair of handlebar posts coupled to a pair of handlebar post tubes of the front frame, and a golf bag support assembly arranged on the front frame. The tricycle also includes a foldable rear half releasably coupled to the foldable front half. The foldable rear half includes a drivable rear wheel, a rear frame releasably coupled to the front frame, a chainwheel drive arranged on a down tube of the rear frame and operatively coupled to the drivable rear wheel, and a seat assembly arranged on a rear tube of the rear frame.

9 Claims, 5 Drawing Sheets

(56) References Cited

U.S. PATENT DOCUMENTS

| | | | | |
|---|---|---|---|---|
| 5,145,196 A * | 9/1992 | Langkamp | A61G 5/023 | 280/278 |
| 5,277,267 A * | 1/1994 | Tiffany | B62D 61/08 | 180/208 |
| 5,312,126 A * | 5/1994 | Shortt | B62K 5/00 | 280/287 |
| 5,328,193 A * | 7/1994 | Shiew | B62K 3/002 | 280/62 |
| 6,139,032 A * | 10/2000 | Hartman | B62B 3/12 | 280/32.7 |
| 6,367,824 B1 * | 4/2002 | Hayashi | B62K 5/05 | 280/124.103 |
| 6,390,216 B1 * | 5/2002 | Sueshige | B60K 1/04 | 180/208 |
| 6,986,522 B2 * | 1/2006 | Sinclair | B62K 15/006 | 280/278 |
| 7,537,076 B2 * | 5/2009 | Falkiner | A63B 55/57 | 180/208 |
| 7,621,548 B2 * | 11/2009 | Weber | A63B 55/00 | 280/288.4 |
| 7,631,715 B2 * | 12/2009 | Falkiner | B62K 5/027 | 180/210 |
| 7,954,838 B1 * | 6/2011 | Long | B60R 9/10 | 280/202 |
| 8,573,338 B2 * | 11/2013 | Gal | B62B 5/0026 | 180/65.1 |
| D697,683 S * | 1/2014 | du Toit | D34/15 | |
| 8,894,084 B1 * | 11/2014 | Yap | B62K 15/008 | 280/278 |
| 9,550,540 B1 * | 1/2017 | Wang | B62J 11/00 | |
| 2004/0245745 A1 * | 12/2004 | Vasser | B62K 3/005 | 280/282 |
| 2004/0251655 A1 * | 12/2004 | Lindsay | A61G 5/023 | 280/282 |
| 2006/0151224 A1 * | 7/2006 | Vasser | A63B 21/00181 | 180/206.5 |
| 2015/0042063 A1 * | 2/2015 | Serpa | B62K 5/05 | 280/267 |

\* cited by examiner

TRICYCLE FOR PLAYING GOLF

TECHNICAL FIELD

The present disclosure relates to a tricycle and, more particularly, to a tricycle for playing golf.

BACKGROUND

In the game of golf, golfers generally play an average golf course of nine holes, eighteen holes, or more, and they cover a substantial distance of the golf course during the game. Oftentimes, golfers use a transportation means such as a powered golf cart (e.g., electric or gas powered) for movement within the golf course. Alternatively, the golfer may walk in the golf course carrying a golf bag or may pull the golf bag using a wheeled cart or may hire the services of a caddy.

Another form of transportation for example cycling within the golf course can be advantageous for the golfers as compared to other forms of transportation. For example, as compared to walking, cycling may be easier for the golfer to move between shots and holes, and the golfer can speed up the game of golf. Further, as compared to the powered golf cart, cycling with the golfer's own vehicle can save cart rental expenditure and can also be a physical exercise while playing golf. In addition, many golf courses require two golfers to share the powered golf cart that may be inconvenient for them, especially in scenarios when they have hit the golf balls in two different directions. Currently existing bicycles or tricycles for playing golf have fixed frames that may not be convenient for being transported to and from the golf course. Also, these bicycles or tricycles are not efficiently designed to carry large and heavy golf bags to move around the golf course without damaging fairways of the golf course.

SUMMARY

Various embodiments of the present disclosure provide a tricycle for playing golf.

In one embodiment, a tricycle for playing golf is disclosed. The tricycle includes a foldable front half. The foldable front half includes a pair of steerable front wheels, a front frame supported between the pair of steerable front wheels, a pair of handlebar posts coupled to the front frame, and a golf bag support assembly arranged on the front frame. The tricycle also includes a foldable rear half releasably coupled to the foldable front half. The foldable rear half includes a drivable rear wheel, a rear frame, a chainwheel drive arranged on the rear frame and operatively coupled to the drivable rear wheel, and a seat assembly arranged on the rear frame.

In another embodiment, a tricycle for playing golf is disclosed. The tricycle includes a foldable front half having a pair of steerable front wheels; a front frame supported between the pair of steerable front wheels, the front frame includes a pair of handlebar post tubes coupled to the pair of steerable front wheels, a front cross bar extending between the pair of handlebar post tubes, and a pair of front bars extending from the front cross bar; a pair of handlebar posts coupled to the pair of handlebar post tubes; and a golf bag support assembly arranged on the front frame. The tricycle also includes a foldable rear half releasably coupled to the foldable front half. The foldable rear half includes a drivable rear wheel; a rear frame having a down tube releasably coupled to the front cross bar at first end of the down tube and includes a down tube fork at a second end of the down tube for supporting the drivable rear wheel, and a rear tube releasably coupled to top of the pair of front bars at first end of the rear tube and includes a rear tube fork at a second end of the rear tube for supporting the drivable rear wheel; a chainwheel drive arranged on the down tube and operatively coupled to the drivable rear wheel, and a seat assembly arranged on the rear tube.

Other aspects and example embodiments are provided in the drawings and the detailed description that follows.

BRIEF DESCRIPTION OF THE FIGURES

For a more complete understanding of example embodiments of the present disclosure, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Referring now to the drawings, FIGS. 1-5 are schematic illustrations of a tricycle for playing golf, in accordance with an example embodiment. Specifically, FIGS. 1-5 illustrate a schematic perspective view of a tricycle 1, a schematic side view of the tricycle 1, a schematic front view of the tricycle 1, a schematic perspective view of a foldable front half 2 of the tricycle 1 of FIG. 1, and a schematic side view of a foldable rear half 3 of the tricycle 1 of FIG. 1, respectively.

Figure 1:
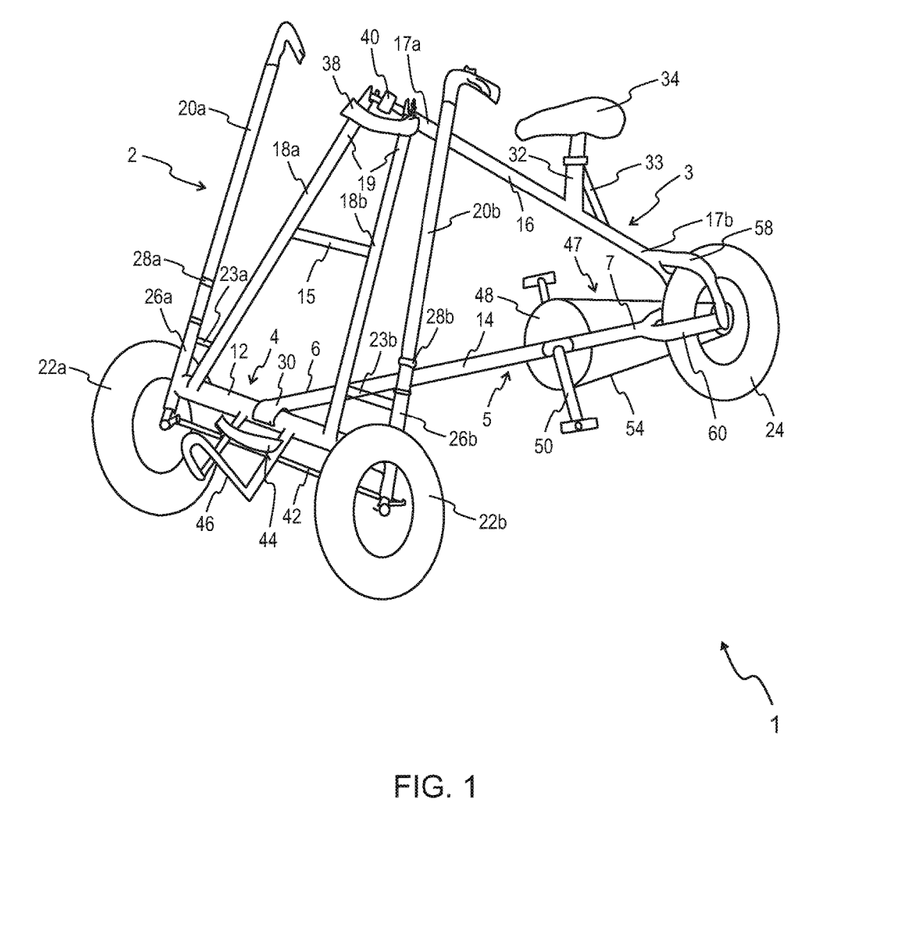
FIG. 1 is a schematic perspective view of a tricycle for playing golf, in accordance with an example embodiment.
Figure 2:
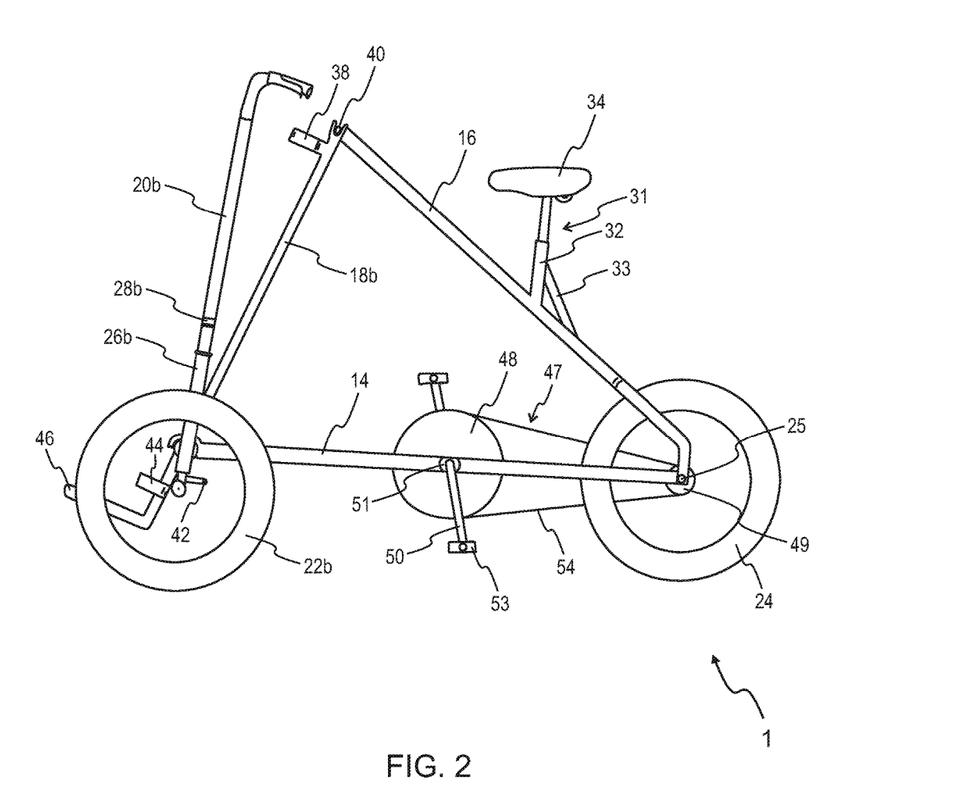
FIG. 2 is a schematic side view of the tricycle of FIG. 1, in accordance with an example embodiment.
Figure 3:
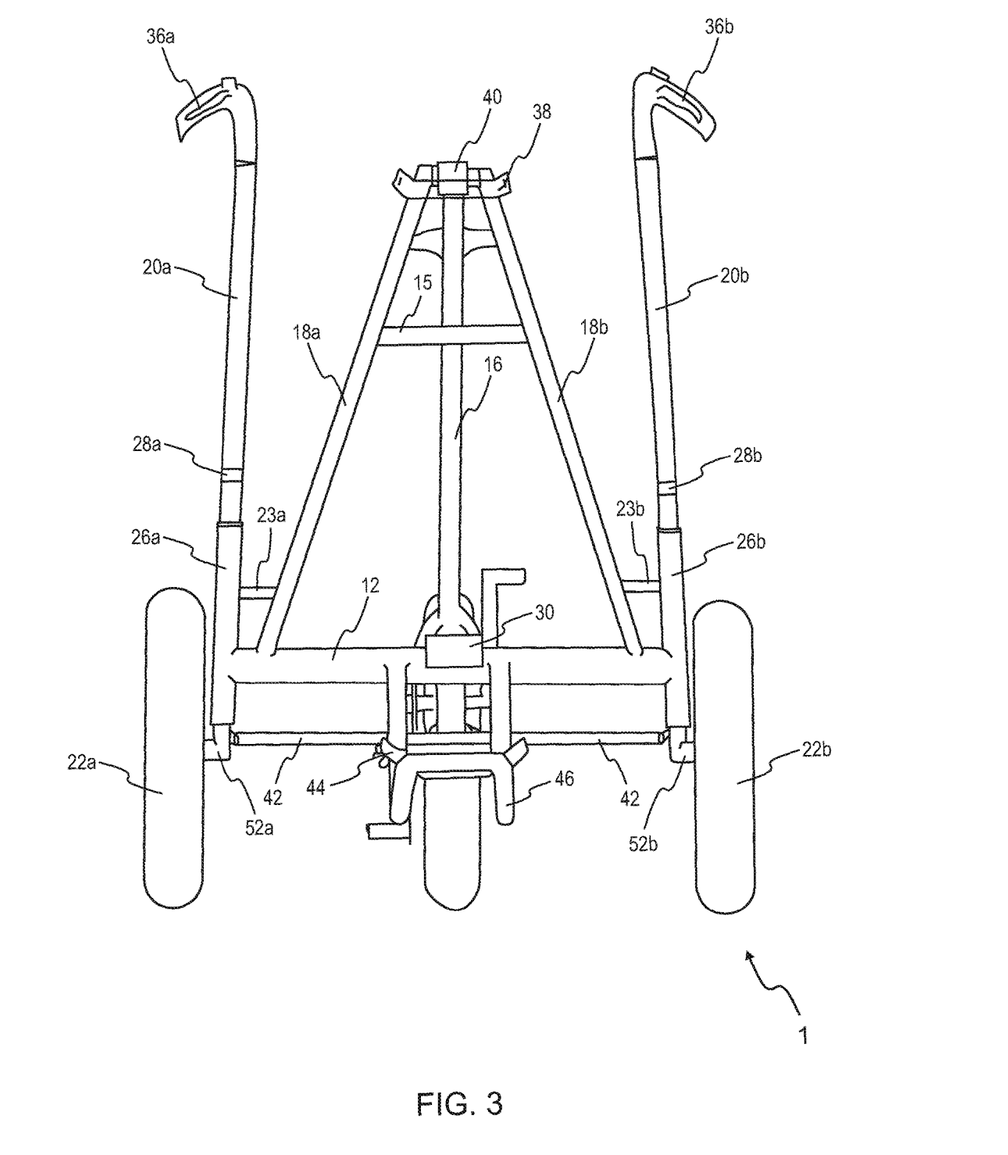
FIG. 3 is a schematic front view of the tricycle of FIG. 1, in accordance with an example embodiment.

Referring now to the drawings, FIGS. 1-3 are schematic illustrations of a tricycle 1 for playing golf, in accordance with an example embodiment. Specifically, the present disclosure relates to the tricycle 1 that is configured to carry a golf bag (not shown). In an embodiment, the tricycle 1 can be configured to attain an active (or unfolded) state in use and a compact (folded) state when idle.

As shown in FIG. 1, the tricycle 1 includes a foldable front half 2 and a foldable rear half 3. The foldable front half 2 includes a pair of steerable front wheels 22a, 22b. The foldable front half 2 also includes a front frame 4 supported between the pair of steerable front wheels 22a, 22b. The front frame 4 includes a pair of handlebar post tubes 26a, 26b coupled to the pair of steerable front wheels 22a, 22b. The front frame 4 also includes a front cross bar 12 extending between the pair of handlebar post tubes 26a, 26b, and a pair of front bars 18a, 18b extending from the front cross bar 12. In one embodiment, the foldable front half 2 may also include a pair of cross support bars 23a, 23b extending between the pair of handlebar post tubes 26a, 26b and the pair of front bars 18a, 18b.

The foldable front half 2 also includes a pair of handlebar posts 20a, 20b coupled to the pair of handlebar post tubes 26a, 26b. The foldable front half 2 further includes a golf bag support assembly arranged on the front frame 4 for carrying a golf bag (not shown). Specifically, the golf bag support assembly includes an upper golf bag support 38 arranged on top of the pair of front bars 18a, 18b. The golf bag support assembly also includes a lower golf bag support 44 and a bottom golf bag support 46 arranged on the front cross bar 12. The golf bag support assembly may also include straps (not shown) for tightening and securing a golf bag to the upper and lower golf bag supports 38, 44.

The foldable front half 2 further includes a pair of folding boxes 28a, 28b for foldably coupling the pair of handlebar posts 20a, 20b with the pair of handlebar post tubes 26a, 26b, respectively. In one embodiment, the pair of folding boxes 28a, 28b are foldable couplers, such as hinge couplers.

The foldable front half 2 further comprises a pair of brake levers 36a, 36b (as shown in FIG. 3), mounted on the pair of handlebar posts 20a, 20b. The pair of brake levers 36a, 36b is operatively coupled to the pair of steerable front wheels 22a, 22b. It is to be understood that the pair of brake levers 36a, 36b, may be operatively coupled to the pair of steerable front wheels 22a, 22b using elements like braking cables and disc brake rotors and disc brake calipers (assuming disc brakes are used here, not shown), which enables controlling the speed of the tricycle 1. In an embodiment, at least one brake lever of the pair of brake levers 36a, 36b may be configured with a parking lock mechanism (not shown) for locking the movement of the tricycle 1 in a parking state, particularly, on an uneven ground.

The foldable front half 2 also includes a pair of front wheel axles 52a, 52b (shown in FIG. 3) for coupling the pair of steerable front wheels 22a, 22b with the pair of handlebar post tubes 26a, 26b. The pair of handlebar post tubes 26a, 26b is the fixed part of the front frame 4. Alternatively, the pair of handlebar posts 20a, 20b may be foldable about the folding boxes 28a and 28b. The pair of front wheel axles 52a, 52b is mounted to the bottom parts of a pair of steering tubes outside the handlebar post tubes 26a, 26b. The pair of front wheels 22a and 22b is mounted to the pair of front wheel axles 52a, 52b. A pair of tie rod ends of a tie rod 42 extended to the bottom parts of the steering tubes. The disc brakes, particularly, the disc brakes callipers may be mounted to the bottom of steering tubes. The tie rod 42, connected to the pair of tie rod ends, is operatively coupled to the pair of front wheel axles 52a, 52b for ensuring the pair of handlebar posts 20a, 20b and the pair of front wheels 22a, 22b to turn in a same direction (e.g., a maneuvering direction).

The foldable rear half 3 is releasably coupled to the foldable front half 2, which will be explained in greater detail herein later. The foldable rear half 3 includes a drivable rear wheel 24. The foldable rear half 3 also includes a rear frame 5. The rear frame 5 includes a down tube 14 releasably coupled to the front cross bar 12 at a first end 6 of the down tube 14. The down tube 14 includes a receiving mechanism 30 at the first end 6 for releasably coupling to the front cross bar 12. In an embodiment, the receiving mechanism 30 may be a curve portion configured to be snugly coupled to a central portion of the front cross bar 12. Alternatively, the receiving mechanism 30 may be a quick release mount having support tabs (not shown, mounted on the central portion of the front cross bar 12), and a nut and bolt arrangement (not shown, mounted on the first end 6 of the down tube 14) adapted to be removably coupled to the support tabs.

The down tube 14 also includes a down tube fork 60 at a second end 7 of the down tube 14 for supporting the drivable rear wheel 24. Specifically, the drivable rear wheel 24 is centrally and rotably mounted on a rear wheel axle 25 (shown in FIG. 2), and the rear wheel axle 25 is coupled to the down tube fork 60 for supporting the drivable rear wheel 24 therebetween.

The foldable rear half 3 also includes a rear tube 16 releasably coupled to top 19 of the pair of front bars 18a, 18b at a first end 17a of the rear tube 16. The rear tube 16 includes a rear tube fork 58 at a second end 17b of the rear tube 16 for supporting the drivable rear wheel 24. The drivable rear wheel 24 is centrally and rotably mounted on the rear wheel axle 25. The rear tube fork 58 ends can rotate around a pair of nuts (not shown) on the down tube folk 60. Alternatively, the rear wheel axle 25 is also coupled to the rear tube fork 58 for supporting the drivable rear wheel 24 therebetween.

The foldable rear half 3 also includes a chainwheel drive 47 arranged on the down tube 14 and operatively coupled to the drivable rear wheel 24. As shown in FIG. 2, the chainwheel drive 47 includes a front sprocket wheel 48 rotably arranged on the down tube 14. It is to be understood that, the front sprocket wheel 48 is rotably arranged on the down tube 14 using a bearing and an axle assembly 51. The chainwheel drive 47 also includes a rear sprocket wheel 49 rotably arranged on the rear wheel axle 25, which supports the drivable rear wheel 24. The chainwheel drive 47 also includes a chain 54 for rotably coupling the front sprocket wheel 48 with the rear sprocket wheel 49. The chainwheel drive 47 further includes a pair of cranks, such as a crank 50, coupled to the front sprocket wheel 48, and particularly to the bearing and the axle assembly 51. The chainwheel drive 47 also includes a pair of pedals, such as a pedal 53, arranged on the pair of cranks, such as the crank 50.

As shown in FIG. 2, the foldable rear half 3 also includes a seat assembly 31 arranged on the rear tube 16. As shown, the seat assembly includes a seat tube 32 coupled to the rear tube 16, and a seat 34 arranged on the seat tube 32. In an embodiment, the seat assembly 31 may also include a support bar 33 extending rearwardly from the seat tube 32 to the rear tube 16. Further, the seat 34 may be coupled to the seat tube 32 in a manner such that seat height may be adjustable, and the seat 34 may be removable from the seat tube 32 when the tricycle 1 is configured to attain the compact state from the active state.

The foldable rear half 3 further includes a quick release mount 40 adapted to releasably couple the top 19 of the pair of front bars 18a, 18b to the first end 17a of the rear tube 16 (shown in FIG. 1). The top 19 of the pair of front bars 18a, 18b includes forked ends 56a, 56b (shown in FIG. 4) for mounting the rear tube 16 on the pair of front bars 18a, 18b with the quick release mount 40, as shown in FIG. 1. In an embodiment, the pair of front bars 18a, 18b may not include the forked ends 56a, 56b at the top 19 of the pair of front bars 18a, 18b, and hence may not be coupled to the first end 17a of the rear tube 16. Alternatively, the foldable rear half 3 may include a support cross bar 15 extending between the pair of front bars 18a, 18b adjacent to the top 19 thereof. Further, the support cross bar 15 may include a quick release mount, such as having support tabs mounted centrally on the support cross bar, and a nut and bolt arrangement (mounted on the first end 17a of the rear tube 16) adapted to be removably coupled to the support tabs.

Figure 4:
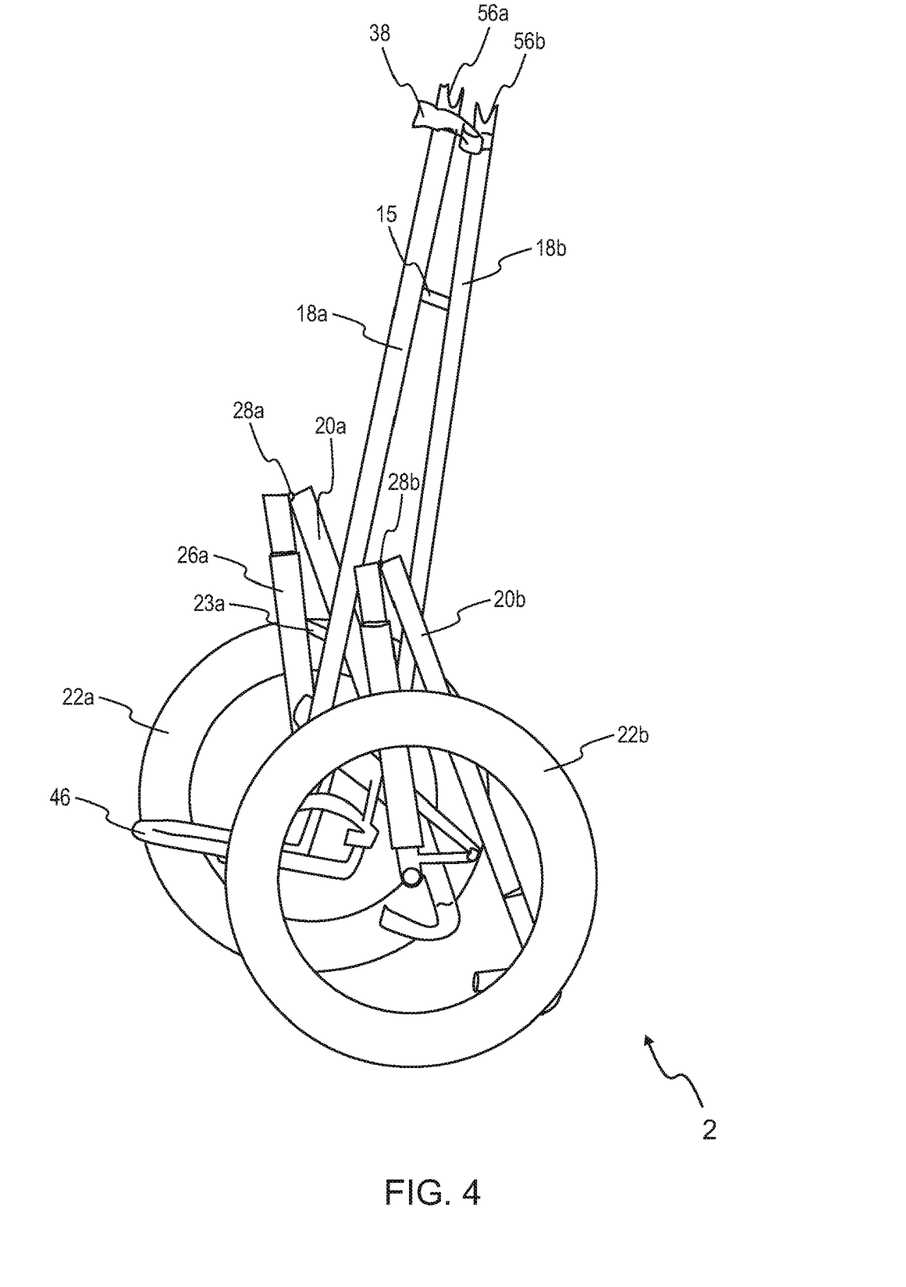
FIG. 4 is a schematic perspective view of a foldable front half of the tricycle of FIG. 1 in a folded state, in accordance with an example embodiment.
Figure 5:
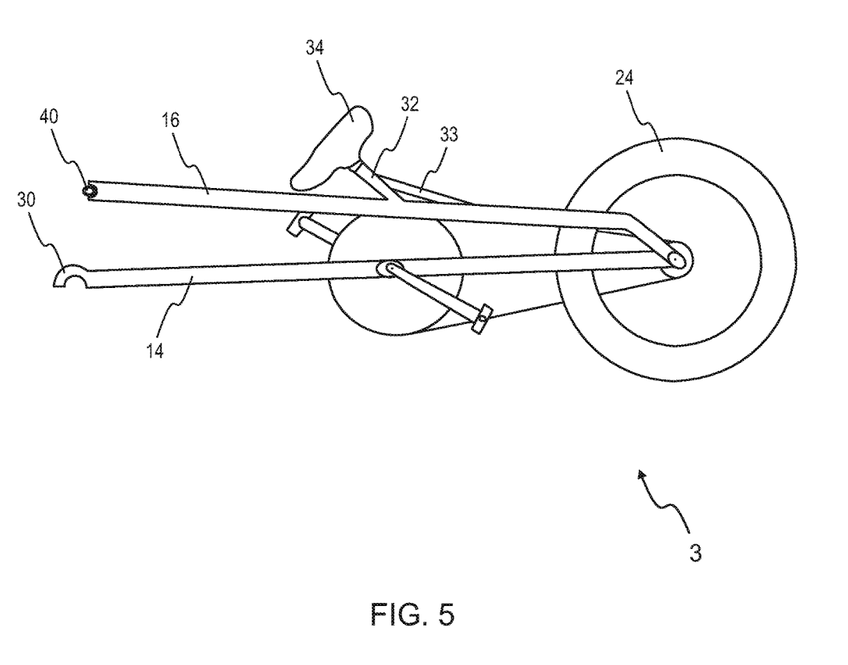
FIG. 5 is a schematic side view of a foldable rear half of the tricycle of FIG. 1 in a folded state, in accordance with an example embodiment.

Referring now to the drawings, FIGS. 4-5 are schematic perspective view of a foldable front half 2 of the tricycle 1 of FIG. 1, and a schematic side view of a foldable rear half 3 of the tricycle 1 of FIG. 1, respectively. As shown, the front frame 4 and the rear frame 5 of the foldable front half 2 and foldable rear half 3, respectively, are detached (decoupled) from each other. Specifically, the receiving mechanism 30 at the first end 6 of the down tube 14 is decoupled from the front cross bar 12, and the first end 17a of the rear tube 16 is decoupled from the top 19 of the pair of front bars 18a, 18b.

As shown in FIG. 4, the pair of handlebar posts 20a, 20b is folded about the pair folding boxes 28a and 28b for allowing the foldable front half 2 to attain a folded state. Further, as shown in FIG. 5, the detached down tube 14 and rear tube 16 are folded by rotating around the rear wheel axle 25 (and/or nuts on the down tube folk 60).

In one embodiment, the tricycle 1 of the present disclosure may be designed to be battery operable. For example, the tricycle 1 may include a battery (such as a rechargeable battery) suitably mounted on a frame, such as the front frame 4 or rear frame 5. Further, the chainwheel drive 47 may be operatively (or electrically) coupled to the battery using suitable electronic and mechanical means for electrically (instead of manually) driving the tricycle 1. Furthermore, the tricycle 1 may be configured to attain differential speed based on electrical power input. Moreover, the tricycle 1 may be made of a light-weighted strong material, such as carbon fiber, aluminum and so forth.

Embodiments of the present disclosure substantially eliminate or at least partially address the aforementioned problems in the background, and enables in providing an efficient transportation means that can be used while playing golf. The present disclosure relates to a human-powered tricycle for carrying a golf bag. The tricycle can be disassembled and folded easily for storage and transportation. For example, the tricycle can be interchanged between an active (or unfolded) state for carrying a golf bag on a golf course to a compact (folded) state that can be easily placed in a car trunk during transportation or storage of the tricycle. The tricycle is designed to include a golf bag support assembly for effectively securing and carrying the golf bag. The tricycle further uses wide (e.g., 2.5 inches minimum), low pressure tires that may be suitable for riding on fairways. Further, the tricycle of the present disclosure provides a transportation means that is easier and faster than walking while it can save golfers cart rental expenditures without giving up exercise compared to driving. Additionally, the tricycle may be configured to add optional electric power assistance.

The embodiments illustrated and described herein as well as embodiments not specifically described herein but within the scope of aspects of the disclosure constitute a tricycle for playing golf. The benefits and advantages described above may relate to one embodiment or may relate to several embodiments. The embodiments are not limited to those that solve any or all of the stated problems or those that have any or all of the stated benefits and advantages.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A tricycle for playing golf, the tricycle comprising:
 a foldable front half comprising:
  a pair of steerable front wheels;
  a front frame supported between the pair of steerable front wheels, the front frame comprising
   a pair of handlebar post tubes operatively coupled to the pair of steerable front wheels,
   a front cross bar extending between the pair of handlebar post tubes, and
   a pair of front bars extending from the front cross bar;
  a pair of handlebar posts coupled to the pair of handlebar post tubes; and
  a golf bag support assembly arranged on the front frame; and
 a foldable rear half releasably coupled to the foldable front half, the foldable rear half comprising
  a drivable rear wheel;
  a rear frame comprising
   a down tube releasably coupled to the front cross bar at a first end of the down tube and
   a down tube fork at a second end of the down tube for supporting the drivable rear wheel, and
   a rear tube releasably coupled to top of the pair of front bars at a first end of the rear tube and a rear tube fork at a second end of the rear tube for supporting the drivable rear wheel;
  a chainwheel drive arranged on the down tube and operatively coupled to the drivable rear wheel; and
  a seat assembly arranged on the rear tube.

2. The tricycle as claimed in claim 1, wherein the foldable front half further comprises a pair folding boxes for foldably coupling the pair of handlebar posts with the pair of handlebar post tubes.

3. The tricycle as claimed in claim 1, wherein the down tube comprises a receiving mechanism at the first end for releasably coupling to the front cross bar.

4. The tricycle as claimed in claim 1, wherein the seat assembly comprises:

a seat tube coupled to the rear tube; and a seat arranged on the seat tube.

5. The tricycle as claimed in claim 1, wherein the foldable front half further comprises a pair of brake levers mounted on the pair of handlebar posts and operatively coupled to the pair of steerable front wheels.

6. The tricycle as claimed in claim 1, wherein the golf bag support assembly comprises:

an upper golf bag support arranged on the top of the pair of front bars; and a lower golf bag support and a bottom golf bag support arranged on the front cross bar.

7. The tricycle as claimed in claim 1, wherein the foldable rear half further comprises a quick release mount adapted to releasably couple the top of the pair of front bars to the first end of the rear tube.

8. The tricycle as claimed in claim 1, wherein the foldable front half further comprises:

a pair of front wheel axles for coupling the pair of steerable front wheels with the pair of handlebar post tubes; and a tie rod operatively coupled to the pair of front wheel axles for ensuring the pair of handlebar posts and the pair of front wheels to turn in a same direction.

9. The tricycle as claimed in claim 1, wherein the chainwheel drive comprises:

a front sprocket wheel rotably arranged on the down tube;

a rear sprocket wheel rotably arranged on a rear wheel axle supporting the drivable rear wheel;

a chain for rotably coupling the front sprocket wheel and the rear sprocket wheel;

a pair of cranks coupled to the front sprocket wheel; and a pair of pedals arranged on the pair of cranks.

* * * * *